Figure 1:
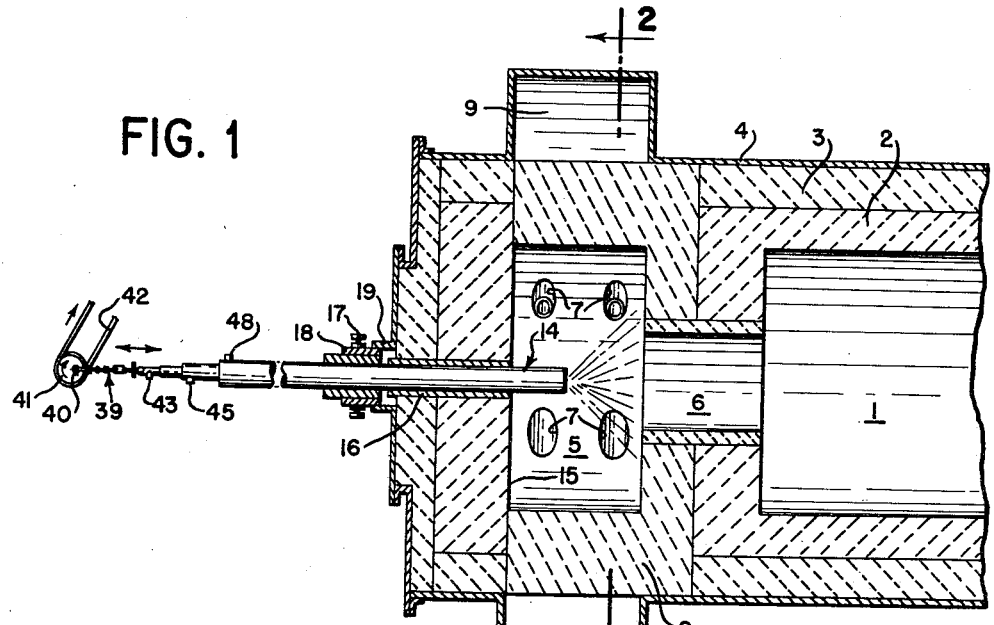

Jan. 1, 1963  E. C. BELLEW  3,071,443
MANUFACTURE OF CARBON BLACK
Filed Sept. 15, 1961  2 Sheets-Sheet 1

INVENTOR
Eugene C. Bellew
BY
ATTORNEYS

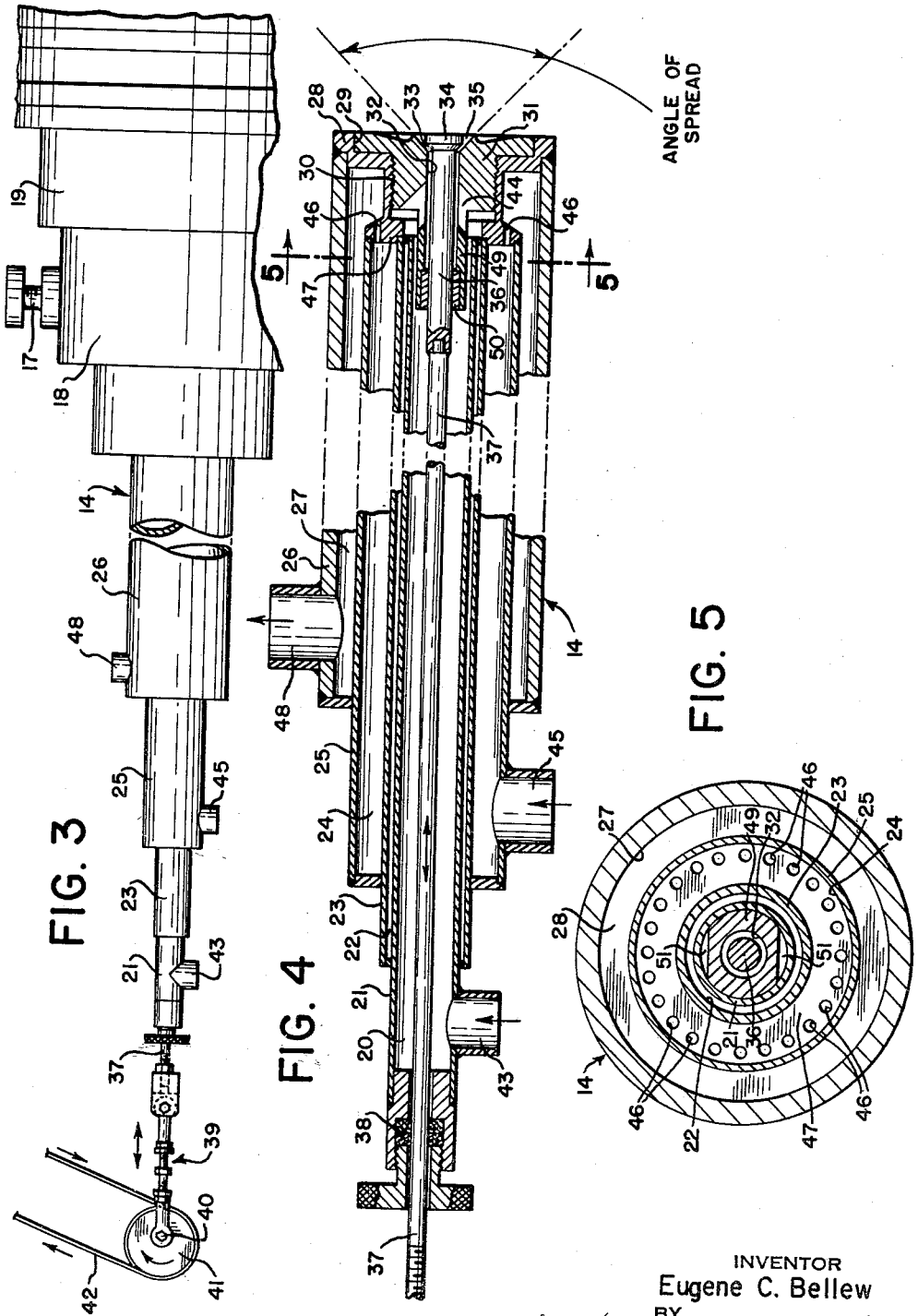

3,071,443
MANUFACTURE OF CARBON BLACK
Eugene C. Bellew, El Dorado, Ark., assignor to Columbian Carbon Company, New York, N.Y., a corporation of Delaware
Filed Sept. 15, 1961, Ser. No. 138,434
5 Claims. (Cl. 23—209.4)

This invention relates to the production of carbon black by the decomposition of hydrocarbons and, more particularly, to processes of the furnace type whereby the hydrocarbon to be decomposed is separately and forcefully injected into a stream of hot gases within the furnace chamber and is rapidly mixed therewith whereby the hydrocarbon is decomposed by heat absorbed from the hot gases to form carbon black in gaseous suspension.

A process of this general type has been described, for instance, in the Ekholm Patent No. 2,599,981 in accordance with which a violently swirling stream of hot blast flame gases is established and maintained in an elongated, unobstructed, heat-insulated reaction chamber of circular cross-section and the hydrocarbon to be decomposed, herein designated "make" or "hydrocarbon make," as introduced through the side wall of the furnace chamber and injected radially inwardly into the swirling hot gas stream passing through the chamber.

In other operations of this general type, the hydrocarbon make has been injected axially into the furnace chamber and rapidly mixed therein with a swirling stream of hot blast flame gases such as established and maintained in accordance with the above-noted Ekholm patent.

The present invention is especially applicable to processes of the types just described, but is also applicable to processes in which a portion of the hydrocarbon make is burned to supply heat for decomposition to carbon black of the remaining portion of the hydrocarbon make, and also to furnace processes of the general type described in which a stream of hot gases of substantially uniform composition and temperature is passed longitudinally through the furnace chamber, as disclosed, for instance, in Patent No. 2,440,424.

Carbon black so produced is extensively used in the compounding of rubber for automobile tires and the like and, as is well-recognized in the art, the characteristics of the resultant rubber composition has been found to depend largely upon the specific characteristics of the carbon black used in the composition.

It is, of course, very desirable that rubber compositions for use in automobile tires have maximum abrasion resistance. High tensile strength of any particular rubber composition is usually a good indication that automobile tires produced therefrom will have good road abrasion resistance. Tensile strength of a rubber composition is, in large measure, a function of the mean particle diameter of the carbon black incorporated therein, the smaller the particle diameter the higher the tensile strength.

Another important rubber characteristic which greatly influences the abrasion resistance of an automobile tire is the heat build-up within the tire in use. A tire that develops a high heat build-up will usually have poor abrasion resistance, regardless of the tensile strength of the rubber composition.

A particularly troublesome fact which has confronted the rubber compounder has been that the smaller particle diameter, highly reinforcing carbon blacks, which impart high tensile strength to the rubber composition also cause the rubber composition to have excessively high heat build-up characteristics. Therefore, the rubber compounder, in selecting a carbon black for use in the production of automobile tires, has found it necessary to compromise between tensile strength and heat build-up.

The present invention provides improvements in furnace black processes of the general type heretofore described whereby there is produced a carbon black which imparts to rubber compositions in which is used, either natural or synthetic rubber, not only excellent tensile strength, but also heat build-up characteristics substantially lower than those obtained through the use of other carbon black of comparable tensile strength characteristics heretofore available.

In carbon black processes of the general type to which the present invention relates, the hydrocarbon make is usually injected into the furnace chamber as an expanding stream or cone. The angle of expansion, herein referred to as "spread angle" or "angle of spread," of the injected hydrocarbon make stream, has heretofore been constant throughout a given operation and has been dependent primarily upon the structure of the hydrocarbon make injector or spray nozzle.

I have found, most surprisingly, that by simple modification of such furnace processes, and particularly the manner in which the hydrocarbon make stream is injected, I can, as noted above, produce carbon blacks which impart to either synthetic or natural rubbers, when compounded therewith, excellent tensile strength-heat build-up relationship as compared with other high abrasion resistance carbon blacks previously available. I have found that the carbon blacks produced according to my present invention embody lower heat build-up characteristics, without substantial loss in tensile strength characteristics of high abrasion resistance carbon black heretofore available and that the heat build-up characteristics can be controlled independently of the tensile strength level.

In injecting the hydrocarbon make into the furnace chamber in accordance with my present invention, I use a pulsating make stream. By the term "pulsating stream," I intend to indicate a stream of liquid hydrocarbon, either in the form of finely-atomized liquid droplets or a stream which enters the furnace chamber in a substantially continuous liquid phase as an expanding cone, as more particularly described and claimed in copending application Ser. No. 49,195, filed August 12, 1960, and in which the angle of spread of the cone is rapidly and continuously changed from a predetermined maximum spread angle, for instance within the range from about 60° to about 90°, to a minimum spread angle closely approximating the axis of symmetry of the spray injector.

Figure 2:
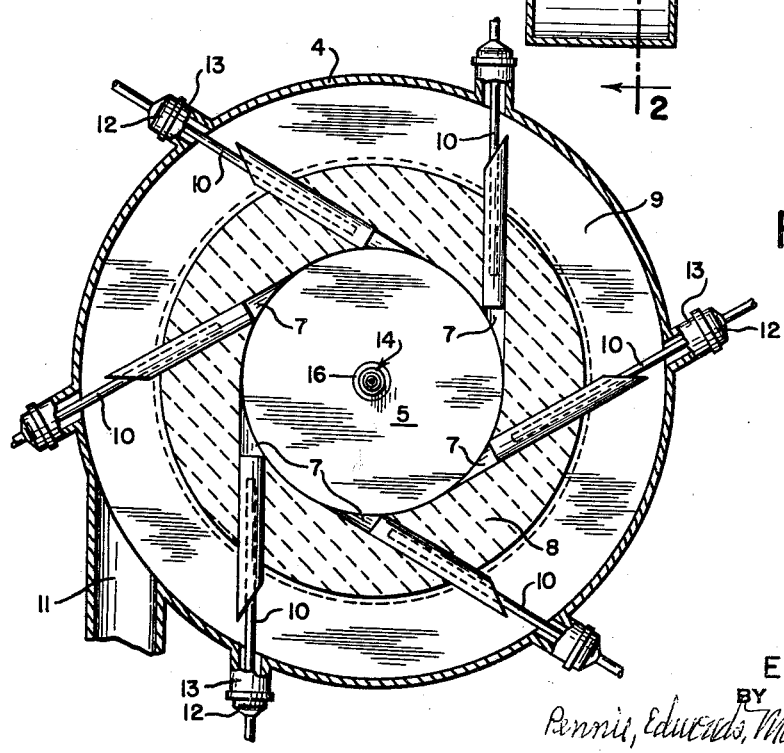

The invention will be further described and illustrated with respect to the accompanying drawings which represent conventionally one form of apparatus especially adapted to the carrying out of my process and of which FIG. 1 is a somewhat fragmentary longitudinal sectional view of the forward end of a carbon black furnace of circular cross-section which may be used in the carrying out of that aspect of my invention in which the hydrocarbon make is injected axially into the swirling stream of hot blast flame gases, FIG. 2 is a transverse sectional view along the line 2—2 of FIG. 1, FIG. 3 is a somewhat enlarged longitudinal elevational view of a hydrocarbon make injection assembly especially adapted to the carrying out of the process of the present invention, FIG. 4 is a longitudinal sectional view showing the injection assembly of FIG. 3 in greater detail, and FIG. 5 is a transverse sectional view along the line 5—5 of FIG. 4.

Referring more particularly to FIG. 1 of the drawings, there is represented the upstream end of an elongated cylindrical reaction chamber 1, which opens at its downstream end into conventional cooling and separating apparatus. The cylindrical inner wall 2 of chamber 1 is constructed of suitable furnace refractory adapted to withstand the necessary high temperature and is surrounded by a layer of heat-insulating material 3, all encased by metal jacket 4.

At the upstream end of the furnace chamber 1, there is provided a combustion zone 5, coaxially connected with the remainder of chamber 1 through a zone 6 of somewhat reduced cross-section. It will be understood, however, that the furnace chamber may be of uniform cross-section throughout, combustion zone 5 being a direct continuation of the chamber, or the diameter of chamber 1 may be somewhat reduced downstream from the combustion zone 5.

For generation of the hot blast flame gases, a combustible mixture of a hydrocarbon fuel and air, for instance, is injected into zone 5 through burner ports 7 directed into zone 5 substantially tangential to the inner circumference of the side wall thereof, as more fully shown in FIG. 2.

As an alternative, the hot blast flame gases may be generated without the furnace chamber and introduced into the chamber tangentially to form the swirling stream of hot blast flame gases therein, as more fully described in the Heller Patent No. 2,918,353.

In the particular apparatus represented by the accompanying drawings, the enlarged combustion zone 5 is delineated by a wall of furnace refractory 8. An annular air chamber 9 is positioned about the outer wall of combustion zone 5 and is connected with the combustion zone 5 by a plurality of burner ports 7 through which fuel inlet pipes 10 extend coaxially. Air for combustion is delivered under pressure tangentially into chamber 9 through air conduit 11.

In FIG. 1, two separate sets of tangential burners are shown. It will be understood that only one set of burners is usually required in a furnace of this type, but that where two are provided they may be used either interchangeably, depending upon operating conditions required, or both sets of burners may be used simultaneously. The fuel pipes 10 are removably supported by caps 12 threaded into, or otherwise secured, to projecting tubes 13.

A hydrocarbon make injection assembly 14, more fully shown in FIGS. 3, 4 and 5 of the drawings, extends coaxially through the upstream end wall 15 into the combustion zone 5 and where it passes through the furnace wall is surrounded by a sleeve 16 through which the assembly is free to slide, so as to adjust the position of its exit port with respect to the upstream end wall 15 of the furnace chamber. This adjustment may be accomplished by proper manipulation of set screws 17 extending through collar 18 which is secured to the furnace structure by flange 19.

The injector assembly, as more fully shown in FIG. 4 of the drawings, comprises a coaxially-positioned cylindrical make conduit 20 delineated by tubular wall 21 and surrounded, for a greater portion of its length, by a coaxial, annular dead-air space 22, lying between the tubes 21 and tubular wall 23. The tube 23 is, in turn, surrounded by a coaxial annular passageway 24 delineated by outer cylindrical wall 25. Coaxially positioned with respect to wall 25 is an outer wall 26 enclosing annular passageway 27. Secured to the downstream end of tube 26, as by welding, there is a circular end plate 28 recessed at 29 and threaded at 30 to receive the removable end plug 31 in which there is coaxially positioned an exit port 32.

The exit port 32, at its outer end, is flared outwardly to form a conical seat 33 adapted to cooperate with the coaxially-positioned conical member 34 to form an outwardly flaring, adjustable, annular opening 35. The adjustable member 35 is secured to a stem 36 extending coaxially through the exit port 32 and secured at its inner end to shaft 37 which extends coaxially outwardly through the assembly and is sealed into the outer end of conduit 20 by means of a packing gland indicated at 38.

At its outer end, the shaft 37 is connected through adjustable linkage represented at 39 to means for imparting a controlled reciprocating motion to the shaft, for instance eccentrically connected at 40, to a concentrically-mounted pulley 41 driven by belt 42. It will be understood that other means for imparting a reciprocating motion to shaft 37 may be employed, for instance any of the well-known cam mechanisms adapted to that purpose.

By rotating pulley 41 about its axis, the shaft 37 will be caused to move back and forth a predetermined distance, thus causing the conical member 34 to move back and forth with respect to the conical seat 33, thereby causing a rapid fluctuation or pulsation in the angle of spread of the annular stream of hydrocarbon make entering the furnace chamber through the outwardly expanding, annular passageway 35.

In operation, the hydrocarbon make is charged to the injector assembly from any suitable source through an inlet shown at 43 and passes through conduit 20 to the inwardly extending portion of the end plug 31, at which point the conduit 20 is connected with the exit port 32 through a plurality of circular openings 44.

Because of the nature of the hydrocarbon make used, it is desirable that it be protected from overheating while passing through the injection assembly, in order to avoid carbon or coke-forming decomposition. It is also important that overheating of the elements of the assembly by the hot furnace gases be avoided. For these reasons, the assembly is jacketed, as previously described, for the circulation of a cooling medium, water for instance. The cooling medium is introduced through inlet conduit 45, passed to the inner end of the assembly through the annular conduit 24 and from thence through the perforations 46 extending through end-closure 47, as more clearly shown in FIG. 5 of the drawings, into the annular conduit 27 and passes back therethrough to the exit opening 48.

In order to maintain the stem 36 in a coaxial position with respect to the exit port 32, the end plug 31 is, with advantage, provided with an inwardly-extending portion 49, having at its innermost end a supporting bearing 50. Further, this inwardly-extending portion 49, though generally of circular cross-section, is cut away at opposite sides, as more clearly shown at 51 of FIG. 5, in order to provide freer passage of the hydrocarbon make to the exit port.

Though injection assemblies, substantially as represented in FIGS. 4 and 5 of the drawings, have been used with particular advantage, it will be understood that the invention is, by no means, restricted with respect thereto, but that the invention, in its broader aspect, contemplates other injector assemblies adapted to the injection of the hydrocarbon make as an expanding, cone-shaped spray and adapted to rapid fluctuation or pulsating of the angle of spread of a spray stream.

The frequency of pulsation of the spray stream is subject to considerable variation, as is also the extent of change in angle of spread and the setting of conical member 34 in its retracted position, the latter being regulated by adjustment of the length of linkage 39. In referring to "frequency of pulsation," we mean a complete cycle from maximum angle of spray to minimum angle of spread and return to maximum angle of spread. Where the pulsation is effected by means shown in FIG. 3 of the drawings, the frequency of pulsation would be represented by r.p.m. of pulley 41.

The extent of movement of the conical member 34, in the apparatus shown, will depend, of course, upon the positioning of the pivotal point 40 with respect to the axis of rotation of pulley 41. In general, this will depend upon the desired extent of fluctuation of the spread angle and upon the nozzle construction of the particular injector being used, for instance the spread angle of the conical seat such as represented at 33.

For any particular type of make injector, the desired maximum spread angle and minimum spread angle of the cycle can readily be determined by simple tests. Optimum maximum and minimum spread angles in any particular type of operation may depend upon other operating conditions, including the location of the make injector with respect to the furnace chamber. As previously noted herein, the spread angle may be caused to change during the cycle from a maximum of about 60°–90° to a minimum approaching zero.

The invention will be illustrated, though in no sense limited, by the following specific examples of operations in which a make injection assembly, substantially as shown in the drawings, was used. In each of these runs, the adjustable linkage 39 was connected to pulley 41 at a point removed 1/16 inch from the axis of rotation of the pulley, thus causing shaft 37 to move back and forth a distance of 1/8 inch and the pulley 41 was rotated at 380 revolutions per minute. However, as previously noted, the frequency of pulsation is subject to considerable variation and the speed of pulley 41 has been varied within a range extending from about 200 to 500 revolutions per minute without material change in results from those obtained in the specific examples.

In order to minimize the number of variables, the hydrocarbon make used in each of the following illustrated runs was the same and had the following characteristics:

Viscosity SSU at 210° F _____ 55
Specific gravity _____ 1.084
A.P.I. gravity _____ −0.9
Mean molecular weight _____ 248
UOP characterization factor (K) _____ 9.72
Bureau of Mines correlation index _____ 130.5
Mean boiling point, ° F _____ 710

It will be understood, however, that the utility of the invention is not restricted to the use of any particular type of hydrocarbon make, though especially advantageous results are obtained using a highly aromatic, high molecular weight, residual hydrocarbon or concentrate of the general nature of that just identified.

It will also be understood, as previously noted herein, that the position of the element 34 with respect to the conical seat 33, when in its retracted position, can be readily adjusted by varying the length of the linkage 39 by conventional means, such as illustrated. The indicated position of element 34 in the following illustrative runs is that measured when the plunger is in the retracted position relative to a zero plunger position when the plunger fits snugly into the conical seat.

EXAMPLE I

Two runs were made under substantially identical conditions except that in one run the plunger was held stationary at a position 3/16 inch from the snug position, thus maintaining the angle of spray constant, as in conventional practice. In the second run, the plunger was similarly positioned, when in the retracted position, but the spray stream was caused to pulsate by rapidly moving the plunger back and forth, as previously indicated. In each run, the oil was preheated to a temperature of 250° F., the air load was 175,000 cubic feet per hour and the air/gas ratio was 12:1. In the comparative non-pulsating run the oil feed rate was 192 gallons per hour and in the pulsating run the oil feed rate was maintained constant at 175 gallons per hour. The characteristics of the resultant carbon blacks, including their rubber compounding properties in natural rubber, are set forth in the following tabulation:

Table 1

| Spray | Non-Pulsating | Pulsating |
|---|---|---|
| Chemical and Colloidal Properties: | | |
| A.B.C. Color | 135 | 135 |
| Tinting Str., Percent Std | 117 | 118 |
| Oil Abs., Gals./100 lbs. black | 16.2 | 16.2 |
| Iodine [1] Adsorption, mg./g. | 103 | 123 |
| Rubber Properties, at 30′ Cure: | | |
| L300 | 2,365 | 2,300 |
| L400 | 3,400 | 3,375 |
| Tensile | 4,280 | 4,450 |
| Elongation | 490 | 550 |
| Shore Hardness | 65 | 68 |
| Percent Rebound | 64.1 | 65.1 |

[1] As determined by ASTM Designation D-1510.

It will be noted that the carbon black produced from the pulsating spray, in accordance with my present invention, had a tensile strength advantage of 170 pounds per square inch over the black produced with the non-pulsating spray. Normally, the carbon black with the highest tensile strength would have the lowest rebound value. However, the black produced in accordance with the present invention gave a one unit advantage in rebound, in spite of the increase in tensile strength. Also, a black with a high iodine adsorption value has usually been found to have a lower rebound value. However, the black produced in accordance with the present invention, in spite of its high iodine adsorption value, was found to have higher rebound characteristics.

It will, of course, be recognized that rebound is indicative of hysteresis or heat build-up characteristics of the rubber composition. The rebound values given herein were determined by the Goodyear-Healy test method (ASTM Designation D1054–53T).

EXAMPLE II

Two runs were made, one with the plunger maintained at 1/16 inch from the snug position and the other using a pulsating spray with the plunger, when in the retracted position, 1/16 inch from the snug position. Furnace conditions were balanced to give approximately the same tensile strength characteristics to the resultant black. The conditions and results of these runs are set forth in the following tabulation:

Table 2

| Type Spray | Non-Pulsating | Pulsating |
|---|---|---|
| Furnace Operating Conditions: | | |
| Air, m.c.f.h. | 175 | 175 |
| Air/Gas Ratio | 12.5/1 | 12/1 |
| Oil, g.p.h. | 245 | 180 |
| Rubber Properties in Natural Rubber: | | |
| 30′ L300 | 1,315 | 1,780 |
| 30′ Tensile | 4,660 | 4,650 |
| Percent Rebound | 61.5 | 63.6 |
| Heat Build-up, ° F. | 251 | 237 |
| Rubber Properties in LTP-60: | | |
| 45′ L300 | 1,225 | 1,680 |
| 45′ Tensile | 4,270 | 4,280 |
| 45′ Shore Hardness | 57 | 58 |
| Percent Rebound | 51.0 | 55.9 |

In spite of the fact that the two resulting blacks had approximately the same tensile strength characteristics, that produced in accordance with the present invention showed, in natural rubber, a 2 unit advantage in rebound and a 4.9 unit advantage in rebound in synthetic rubber.

EXAMPLE III

The following series of runs illustrate the advantage of my improved process in controlling rebound characteristics of the resultant carbon black for a given tensile strength level. This may be accomplished by adjustment of the retracted position of the plunger. The preheat temperatures of the hydrocarbon make and other operating conditions, including the retracted position of the plunger and characteristics of the resultant carbon black, are set forth in the following tabulation. In each of these runs, a pulsating spray was used in accordance with the present invention:

Table 3

| | | | | |
|---|---|---|---|---|
| Plunger Position, inches | 1/16 | 3/16 | 5/16 | 5/16 |
| Air, m.c.f.h. | 210 | 210 | 210 | 210 |
| Air/Gas Ratio | 14.0 | 14.0 | 14.0 | 14.0 |
| Oil, g.p.h. | 230 | 230 | 235 | 230 |
| Oil Temp., °F | 241 | 240 | 228 | 240 |
| Chemical and Colloidal Data: | | | | |
| Tinting Str. % Statex B | 115 | 117 | 121 | 117 |
| Oil Abs., Gals. Oil/100 lbs. black | 16.0 | 16.3 | 16.1 | 15.7 |
| Iodine Ads., mg./gm | 108 | 122 | 121 | 107 |
| Rubber Properties in Natural Rubber: | | | | |
| 30' L300 | 2,500 | 2,470 | 2,460 | 2,500 |
| 30' Tensile | 4,080 | 4,075 | 4,100 | 4,090 |
| 30' Elongation | 470 | 480 | 470 | 475 |
| Percent Rebound | 66.8 | 64.6 | 63.0 | 63.6 |

In arriving at rubber compounding characteristics of the carbon blacks of the foregoing specific examples, the following rubber formulations were used in natural and synthetic rubber, respectively, each of the rubber compositions being cured at a temperature of 293° F., the proportions being expressed in parts by weight.

Rubber formulations:

NR-59—
- Natural rubber crepe — 100
- Carbon — 50
- Stearic acid — 3
- Zinc oxide — 5
- Benzothiazyldisulfide — 0.6
- Sulfur — 2.5
- Total — 161.1

LTP-60—
- Styrene - butadiene rubber (SBR-1500) — 100
- Carbon — 40
- Benzothiazyldisulfide — 0.8
- Zinc oxide — 5
- Tetra methyl thiuram disulfide — 0.15
- Sulfur — 1.75
- Total — 147.70

I claim:

1. In the process for producing carbon black by the decomposition of a hydrocarbon make in which there is established and maintained within an elongated furnace chamber a stream of hot combustion gases at a temperature in excess of that at which the hydrocarbon make is decomposed to carbon black and the hydrocarbon make is forcefully injected into the hot gas stream, rapidly dispersed therein and decomposed by heat absorbed therefrom to form carbon black in suspension, the effluent passing from the downstream end of the chamber and the carbon black separated and collected, the improvement which comprises injecting the hydrocarbon make into the hot gas stream as an expanding, conical spray stream and causing said spray stream to pulsate by rapidly varying the spread angle of the stream.

2. The process of claim 1 in which the frequency of pulsation of the make stream is within the range from about 200 to about 500 per minute.

3. The process of claim 1 in which the hydrocarbon make is a highly aromatic, high molecular weight residual hydrocarbon.

4. The process of claim 1 in which the hydrocarbon make stream is injected coaxially into the upstream end of an elongated furnace chamber of circular cross-section in which there is established and maintained a swirling stream of hot blast flame gases flowing longitudinally through the chamber.

5. The process of claim 1 in which the spread angle of the entering make stream is varied from a maximum within the range of from 60° to 90° to a minimum approaching the symmetrical axis of the make stream.

References Cited in the file of this patent

UNITED STATES PATENTS

| | | |
|---|---|---|
| 2,641,534 | Krejci | June 9, 1953 |
| 2,971,822 | Williams | Feb. 14, 1961 |